United States Patent Office 2,782,918
Patented Feb. 26, 1957

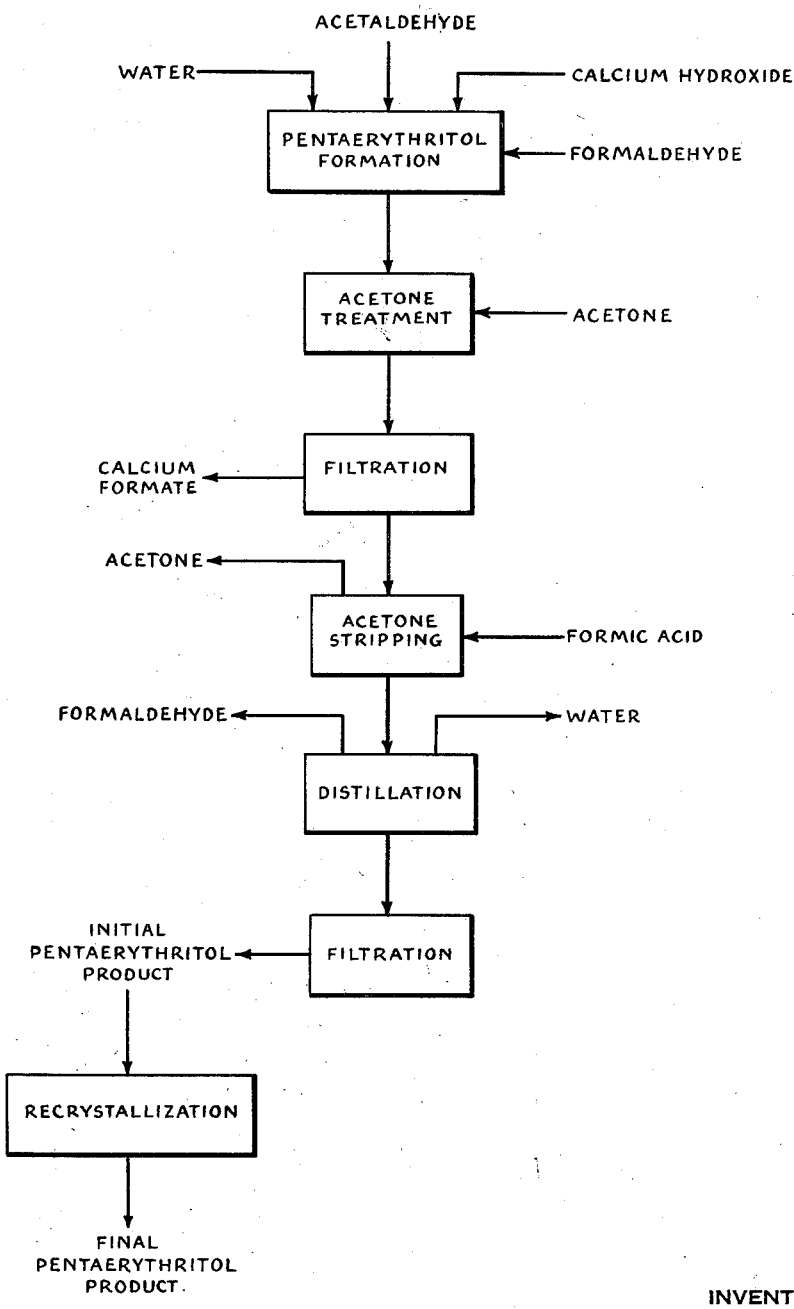

2,782,918

EXTRACTION OF PENTAERYTHRITOL WITH AQUEOUS ACETONE

Ivan Christoffel, Hopewell, Va., assignor to Allied Chemical & Dye Corporation, New York, N. Y., a corporation of New York Application June 18, 1954, Serial No. 437,721

7 Claims. (Cl. 260—637)

This invention relates to a process for the recovery of pentaerythritol from crude aqueous reaction mixtures produced by condensation of formaldehyde and acetaldehyde in aqueous medium in the presence of an alkali earth metal hydroxide.

Pentaerythritol is an important industrial raw material for the preparation of numerous resins and has also been used for manufacture of pentaerythritol tetranitrate explosive.

In the formation of pentaerythritol by condensation of formaldehyde and acetaldehyde in aqueous medium in the presence of calcium hydroxide, it is postulated that the following reactions take place:

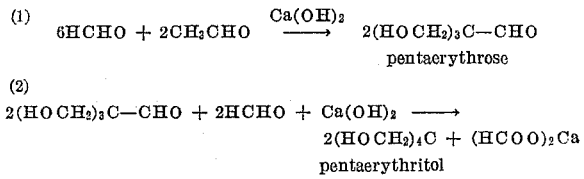

Step (1) is an aldol condensation reaction catalyzed by the hydroxyl ion. Step (2) is a crossed-Cannizzaro reaction in which the pentaerythrose is reduced to pentaerythritol and the formaldehyde is oxidized to formate.

In present commercial processes employing an alkali earth metal hydroxide catalyst such as calcium hydroxide there is produced pentaerythritol product which contains varying amounts of polypentaerythritols and ether-linked polymers of pentaerythritol as well as by-product alkali earth metal formate. Hence, the methods of removing impurities and recovery of formates are important factors in the economics of a process for the production of pentaerythritol.

Particular difficulty has been experienced in the removal of alkali earth metal formates such as calcium formate from the pentaerythritol product. One of the oldest methods for the removal of calcium formate is the addition of sulfuric acid to precipitate most of the calcium as sulfate, followed by addition of oxalic acid to remove the remainder of the calcium as oxalate. The precipitate is filtered off, and the aqueous solution is then evaporated to yield pentaerythritol. Other methods employ only sulfuric acid to precipitate the calcium, the pentaerythritol being isolated by crystallization. Fractional crystallization alone has also been used.

The prior art processes possess many disadvantages. The processes using sulfuric acid to precipitate calcium compounds are complicated by the difficult removal of by-product formic acid. Further, valuable sulfuric acid is consumed during such process. The processes using fractional crystallization for separation of calcium compounds require several expensive evaporation and precipitation steps.

An object of the present invention is to provide a process for purifying pentaerythritol obtained as crude aqueous reaction mixture by the condensation of formaldehyde and acetaldehyde in aqueous medium in the presence of an alkali earth metal hydroxide.

Another object of the present invention is to provide a process for separating alkali earth metal compounds from pentaerythritol in the crude aqueous mixture obtained by the condensation of formaldehyde and acetaldehyde in aqueous medium in the presence of an alkali earth metal hydroxide.

A further object of the present invention is to provide a process for recovering high yields of relatively pure alkali earth metal formate and relatively pure pentaerythritol from the crude aqueous reaction mixture formed by the condensation of formaldehyde and acetaldehyde in aqueous medium in the presence of an alkali earth metal hydroxide.

Further objects will be apparent from the following description and examples.

I have made the discovery that the addition of acetone to the pentaerythritol-containing crude aqueous reaction mixture obtained by the condensation of formaldehyde and acetaldehyde in aqueous medium in the presence of an alkali earth metal hydroxide results in precipitation of by-product alkali earth metal formate and unreacted alkali earth metal hydroxide, if any, but permits retention of the pentaerythritol in solution. After the alkali earth metal compounds have been separated by filtration or other suitable procedure, the pentaerythritol can be precipitated by evaporation of the reaction liquors. The resultant partially purified pentaerythritol may then be further purified by a single recrystallization from water to produce relatively pure pentaerythritol.

It was entirely unexpected in view of the known insolubility of pentaerythritol in acetone that acetone could be used to retain pentaerythritol in solution while preferentially precipitating alkali earth metal compounds.

Pentaerythritol-containing crude aqueous reaction mixtures may be produced by any of the well known processes involving the condensation of formaldehyde and acetaldehyde in aqueous medium in the presence of an alkali earth metal hydroxide such as calcium hydroxide, barium hydroxide or strontium hydroxide. The reaction conditions employed in condensing formaldehyde and acetaldehyde are chosen to produce a product of high monopentaerythritol content, high melting point and low phthalic ester resin color. The molar formaldehyde to acetaldehyde ratio which may be used ranges from about 3.5 to 10.0, and preferably is about 4.0 to 8.0. The preferred concentration of alkali earth metal hydroxide is from about 1.2 to 1.6 equivalents per mol of acetaldehyde. Suitable temperature conditions range from about 30° to 60° C. The quantity of water used in the condensation reaction may vary from 15 to 350 mols per mol of acetaldehyde. Since the water must be subsequently evaporated, it is advantageous from an economic standpoint to use as little water as possible.

To obtain maximum separation of alkali earth metal compounds from pentaerythritol-containing crude aqueous reaction mixtures by treatment with acetone in accordance with the present invention, it is important that such crude mixtures contain at least about 15 mols of water per mol of acetaldehyde fed, and preferably about 19 to 85 mols of water per mol of acetaldehyde fed. Crude aqueous reaction mixtures intended for use in practice of the invention may be so prepared employing existing commercial techniques that they contain water in those quantities; accordingly, such mixtures may be treated "as is" with acetone to accomplish the desired separation of alkali earth metal compounds. However, if required to attain the desired water concentration, additional water may be added to the crude aqueous reaction mixture.

Although acetone may be employed in ratio of at least about 0.5 mol per mol of water in the aqueous reaction liquors, it is preferred to use about 0.75 to 1.5 mols of acetone per mol of water in the aqueous reaction liquors. Use of larger amounts of acetone affords very little advantage with respect to precipitation of alkali earth metal compounds and may precipitate some pentaerythritol. As the quantity of water in the aqueous reaction liquors increases, equivalent separation of alkali earth metal compounds from pentaerythritol may be obtained with somewhat lower concentrations of acetone in the water. However, I have found that for water contents covering a wide range, the preferred ratio of about 0.75 to 1.5 mols of acetone per mol of water in the aqueous reaction liquors gives separation of about 80% or more of alkali earth metal formate and substantially all of unreacted alkali earth metal hydroxide.

The acetone may be employed at any temperature ranging up to about 50° C. Particularly suitable acetone temperatures have been found to lie within the range of about 15° to 40° C.

Referring to the accompanying flow diagram, the preferred embodiment of the present invention involves purification of a pentaerythritol-containing crude aqueous reaction mixture produced by the condensation of formaldehyde and acetaldehyde in aqueous medium in the presence of calcium hydroxide. Preferably, the aqueous mixture, as produced, contains about 19 to 85 mols of water per mol of acetaldehyde fed, but, if necessary, additional water may be added to achieve the desired water content.

The aqueous reaction liquors which contain pentaerythritol, by-product calcium formate, and possibly, small amounts of unreacted calcium hydroxide are dumped into agitated acetone maintained at a temperature of about 20° to 50° C. The amount of acetone used is about 0.75 to 1.5 mols per mol of water in the reaction liquors. The acetone, in addition to precipitating at least about 80% of the calcium formate and all but a trace of any unreacted calcium hydroxide also stops the condensation reaction. Hence, addition of formic acid to neutralize the reaction liquors and terminate the reaction is not necessary.

After precipitation of the calcium compounds, they are filtered at about 20° to 50° C. The filter cake may then be washed with aqueous acetone and dried at about 50° to 100° C. The acetone vapors evolved during the drying step may be condensed and recycled to the acetone treatment step. The dried material is relatively pure calcium formate, i. e. calcium formate having a purity of about 95 to 99%. Generally speaking, yields of calcium formate of about 84 to 88%, based on the calcium hydroxide charged, are obtained.

After adding a trace of formic acid to the pentaerythritol solution remaining after removal of the calcium compounds, acetone is stripped therefrom at atmospheric pressure. The stripped acetone may be recycled to the acetone treatment step.

If unreacted formaldehyde is present, the reaction mixture is steam distilled to remove the formaldehyde. The formaldehyde, after stripping methanol therefrom, may be recycled to the pentaerythritol formation step. Water is then evaporated from the reaction mixture until a cooled sample of the concentrated liquor forms a slurry which filters at low water content without carrying excessive amounts of dissolved pentaerythritol to waste.

The slurry of pentaerythritol is cooled to about 20° to 35° C. and filtered. The resulting cake, comprising initial pentaerythritol product in partially purified form, is washed with a small amount of water. Practically all of the calcium formate not precipitated by the acetone treatment remains in the filtrate. The filtrate may then be evaporated for the purpose of reducing its water content and recycled to the acetone treatment step. A relatively pure (about 87 to 95%) monopentaerythritol may be produced by a single recrystallization of the initial pentaerythritol product from water. Enough water at about 80° to 100° C. is added to dissolve the pentaerythritol cake. Any undissolved material, generally comprising polypentaerythritols, is removed by filtration at about 80° to 100° C. The pentaerythritol-water solution is cooled to room temperature, and the pentaerythritol is precipitated using agitation to keep the pentaerythritol in suspension. The resulting slurry is filtered at about 20° to 35° C. and the precipitate washed with cold water. The precipitate is then dried at about 75° to 100° C. and is relatively pure monopentaerythritol. Generally speaking, yields of pentaerythritol of about 64 to 75%, based on the formaldehyde consumed, and about 70 to 85%, based on the acetaldehyde consumed, are obtained.

As shown above, addition of acetone to the crude aqueous pentaerythritol reaction mixture in accordance with the present invention possesses the advantage of precipitating such large quantities of calcium formate that the product may be isolated readily and purified by a single recrystallization from water. Other advantages of the procedure are that a high percentage of calcium formate is removed in relatively pure form, formic acid is not liberated in the pentaerythritol reaction liquors and acetone may be recovered and used in a subsequent run.

The procedure involved in my invention may be more clearly understood from the following specific examples taken in connection with the accompanying flow diagram. In the examples parts are by weight.

*Example 1.*—1727 parts of a 37% aqueous formaldehyde solution and 217 parts of a 54% aqueous acetaldehyde solution were reacted at 40° to 50° C. in the presence of 161 parts of calcium hydroxide as a slurry in 161 parts of water. The mol ratio of formaldehyde to acetaldehyde was about 8 to 1. Since the ensuing reaction was exothermic, external cooling was required to maintain the reaction mixture at 40° to 50° C. The crude aqueous reaction mixture contained about 28 mols of water per mol of acetaldehyde fed.

After a total reaction time of 20 minutes, the reaction was terminated by mixing the crude aqueous reaction liquors with acetone maintained at 25° C. The amount of acetone used was equivalent to about 0.9 mol with respect to 1 mol of water in the reaction liquors. About 87% of the input calcium was precipitated as calcium formate, and all but a trace of the unreacted calcium hydroxide precipitated immediately. The precipitated calcium compounds were removed by filtration at 25° C. The filter cake was washed with aqueous acetone and then dried at 100° C. 253 parts of 97% calcium formate, representing a yield of about 87%, based on the calcium hydroxide charged, were obtained.

After adding a trace of formic acid to the mother liquors obtained from filtration of the calcium compounds, acetone was stripped therefrom at atmospheric pressure. The reaction mixture was then steam distilled to remove formaldehyde. Water was next evaporated from the reaction mixture until a cooled sample of the concentrated liquor formed a slurry which filtered at low water content without carrying excessive amounts of dissolved pentaerythritol to waste.

The slurry of pentaerythritol was cooled to 25° C. and filtered. The resulting pentaerythritol cake was washed with a small amount of water. Enough water at 100° C. was then added to dissolve the pentaerythritol cake. The pentaerythritol-water solution was cooled to room temperature, and the pentaerythritol was precipitated using agitation to keep pentaerythritol in suspension. The resulting slurry was filtered at 25° C. and the precipitate washed with cold water. After drying the precipitate at 100° C., 290 parts of 94% monopentaerythritol were obtained. This amount of pentaerythritol represented a 70% yield, based on the formaldehyde consumed, and an 80% yield, based on the acetaldehyde consumed.

Example 2.—1815 parts of an 11% aqueous formaldehyde solution and 309 parts of a 19% aqueous acetaldehyde solution were reacted at 48° to 50° C. in the presence of 80.6 parts of calcium hydroxide as a slurry in 80.6 parts of water. The mol ratio of formaldehyde to acetaldehyde was about 5 to 1. External cooling was required to maintain the reaction mixture at 48° to 50° C. The crude reaction mixture contained about 81 mols of water per mol of acetaldehyde fed.

After a total reaction time of 20 minutes, the reaction was terminated by mixing the crude aqueous reaction liquors with acetone maintained at about 25° C. About 85% of the input calcium was precipitated as calcium formate and all but a trace of the unreacted calcium hydroxide precipitated immediately. The precipitated calcium compounds were removed by filtration at 25° C. The filter cake was washed with aqueous acetone and then dried at 100° C. 128 parts of 95% calcium formate, representing a yield of about 85%, based on the calcium hydroxide charged, were obtained.

After adding a trace of formic acid to the mother liquors obtained from filtration of the calcium compounds, acetone was stripped therefrom at atmospheric pressure. Water was then evaporated from the reaction mixture until a cooled sample of the concentrated liquor formed a slurry which filtered at low water content without carrying excessive amounts of dissolved pentaerythritol to waste.

The slurry of pentaerythritol was cooled to 25° C. and filtered. The resulting pentaerythritol cake was washed with a small amount of water. Enough water at 80° C. was then added to dissolve the pentaerythritol in the cake. The pentaerythritol-water solution was filtered, then cooled to room temperature, and the pentaerythritol was precipitated using agitation to keep the pentaerythritol in suspension. The resulting slurry was filtered at 25° C. and the precipitate washed with cold water. After drying the precipitate at 100° C., 154 parts of 87% monopentaerythritol were obtained. This amount of pentaerythritol represented a 68% yield, based on the formaldehyde consumed, and an 85% yield, based on the acetaldehyde consumed.

While the above describes the preferred embodiments of my invention, it will be understood that departures may be made therefrom within the scope of the specification and claims.

I claim:

1. In a process for the production of pentaerythritol by condensation of formaldehyde and acetaldehyde in aqueous medium in the presence of an alkali earth metal hydroxide, the steps which comprise adding acetone to the aqueous reaction mixture containing at least 15 mols of water per mol of acetaldehyde fed to precipitate alkali earth metal compounds contained therein, separating said alkali earth metal compounds from the reaction mixture and recovering pentaerythritol from the resulting solution.

2. In a process for the production of pentaerythritol by condensation of formaldehyde and acetaldehyde in aqueous medium in the presence of calcium hydroxide, the steps which comprise adding acetone to the aqueous reaction mixture containing at least 15 mols of water per mol of acetaldehyde fed to precipitate calcium compounds contained therein, separating said calcium compounds from the reaction mixture and recovering pentaerythritol from the resulting solution.

3. In a process for the production of pentaerythritol by condensation of formaldehyde and acetaldehyde in aqueous medium in the presence of an alkali earth metal hydroxide, the steps which comprise adding to the aqueous reaction liquors containing at least 15 mols of water per mol of acetaldehyde fed at least about 0.5 mol of acetone per mol of water in the liquors, thereby precipitating alkali earth metal compounds contained therein, separating said alkali earth metal compounds from the reaction liquors and recovering pentaerythritol from the resulting solution.

4. In a process for the production of pentaerythritol by condensation of formaldehyde and acetaldehyde in aqueous medium in the presence of calcium hydroxide, the steps which comprise adding to the aqueous reaction liquors containing at least 15 mols of water per mol of acetaldehyde fed at least about 0.5 mol of acetone per mol of water in the liquors, thereby precipitating calcium compounds contained therein, separating said calcium compounds from the reaction liquors and recovering pentaerythritol from the resulting solution.

5. In a process for the production of pentaerythritol by condensation of formaldehyde and acetaldehyde in aqueous medium in the presence of an alkali earth metal hydroxide, the steps which comprise adding to the aqueous reaction liquors containing about 19 to 85 mols of water per mol of acetaldehyde fed about 0.75 to 1.5 mols of acetone per mol of water in the liquors, thereby precipitating alkali earth metal compounds contained therein, separating said alkali earth metal compounds from the reaction liquors and recovering pentaerythritol from the resulting solution.

6. In a process for the production of pentaerythritol by condensation of formaldehyde and acetaldehyde in aqueous medium in the presence of calcium hydroxide, the steps which comprise adding to the aqueous reaction liquors containing about 19 to 85 mols of water per mol of acetaldehyde fed about 0.75 to 1.5 mols of acetone per mol of water in the liquors, thereby precipitating calcium compounds contained therein, separating said calcium compounds from the reaction liquors and recovering pentaerythritol from the resulting solution.

7. In a process for the production of pentaerythritol by condensation of formaldehyde and acetaldehyde in aqueous medium in the presence of calcium hyroxide, the steps which comprise adding to the aqueous reaction liquors containing about 19 to 85 mols of water per mol of acetaldehyde fed about 0.75 to 1.5 mols of acetone per mol of water in the liquors, thereby precipitating calcium compounds contained therein, separating said calcium compounds from the reaction liquors, evaporating the resulting solution to form solid pentaerythritol, separating said solid pentaerythritol and recrystallizing said separated solid pentaerythritol from water.

References Cited in the file of this patent

UNITED STATES PATENTS 2,468,718    Wyler                Apr. 26, 1949

OTHER REFERENCES

Marrian: "The Chemical Reactions of Pentaerythritol," Chemical Reviews, page 149 (Aug. 1948).